United States Patent [19]
James et al.

[11] 3,974,049
[45] Aug. 10, 1976

[54] ELECTROCHEMICAL PROCESS

[75] Inventors: George Stephen James, Johannesburg; Bruce Ian Dewar, Randburg; Walter Rudolf Moergeli, Maraisburg-Roodepoort, all of South Africa

[73] Assignee: Parel. Societe Anonyme, Luxembourg, Luxemburg

[22] Filed: July 30, 1974

[21] Appl. No.: 493,645

[30] Foreign Application Priority Data

| Aug. 3, 1973 | South Africa | 73/5310 |
| Aug. 3, 1973 | South Africa | 73/5311 |
| Dec. 14, 1973 | South Africa | 73/9490 |
| Dec. 14, 1973 | South Africa | 73/9491 |
| Dec. 14, 1973 | South Africa | 73/9494 |
| May 24, 1974 | South Africa | 74/3330 |

[52] U.S. Cl. ................ 204/106; 204/222
[51] Int. Cl.² ............... C25C 1/12; C25C 7/02
[58] Field of Search ........ 204/284, DIG. 10, 105 R, 204/105 M, 106–108, 109–111, 112–113, 114–119, 222

[56] References Cited
UNITED STATES PATENTS

| 3,483,568 | 12/1969 | Andersen et al. | 204/105 R |
| 3,787,293 | 1/1974 | Kametani | 204/108 |

FOREIGN PATENTS OR APPLICATIONS

| 1,910,286 | 11/1970 | Germany | 204/275 |

*Primary Examiner*—R. L. Andrews
*Attorney, Agent, or Firm*—Armstrong, Nikaido & Wegner

[57] ABSTRACT

There is disclosed an electrochemical process wherein an electrolyte is passed through one electrode compartment of an electrochemical cell, said one electrode compartment comprising a particulate electrode and being separated from a second electrode compartment of said electrochemical cell containing a counter-electrode by a separator having an ion-permeable wall inclined away from the vertical and towards the particulate electrode. The distribution of the particles of said particulate electrode in the electrolyte during the process is controlled in a manner such that there is formed within said one electrode compartment a first region which is adjacent to the ion-permeable wall and within which first region substantially all the particles are, for a large proportion of the time they spend in said first region, separated from each other, and a second region which is spaced from the ion-permeable wall and within which second region substantially all the particles are, for a large proportion of the time they spend in said second region, in contact with other particles, and substantially all the particles are circulated between said first and second regions.

16 Claims, 8 Drawing Figures

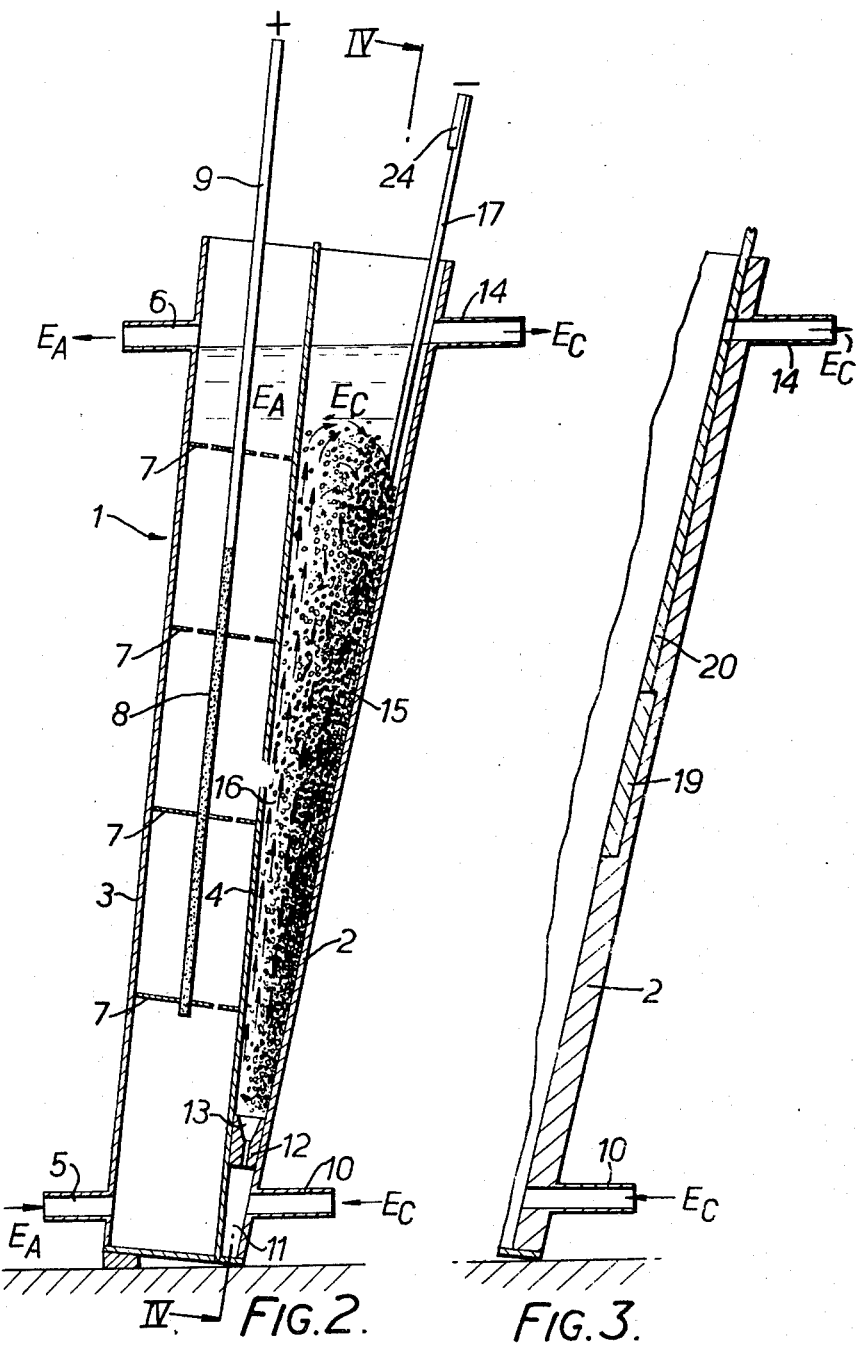

ELECTROCHEMICAL PROCESS

The invention has particular application to the electrodeposition of metals in which metal is electrodeposited onto the particles of a particulate cathode which are removed from the cathode compartment.

BACKGROUND OF THE INVENTION

This invention relates to electrochemical processes and apparatus and is concerned with electrochemical processes and electrochemical cells employing particulate electrodes.

In general, electrochemical processes may be considered as being either cathodic processes or anodic processes depending on the electrode at which the technically important reaction occurs. Most cathodic processes involve either metal electrodeposition or electrolytic reduction of a constituent of the electrolyte in the presence of hydrogen formed at the cathode; in the former class of cathodic process are electroplating, electrorefining and electrowinning and in the latter class are the reduction of organic compounds and the production of caustic soda. Most anodic processes involve either the discharge of anions from solution at an essentially stable anode or the dissolution of the anode itself; in the former class of anodic process are processes for the production of chlorine and oxygen and in the latter class are processes for recovering valuable metal from scrap and the refining or purification of metals. Further details of industrial electrochemical processes are given in the book "Industrial Electrochemical Processes" edited by A. Kuhn and published by Elsevier in 1971.

The present invention is primarily, but not exclusively, concerned with cathodic processes, especially processes for electrowinning metals, and with particulate electrodes and electrochemical cells incorporating particulate electrodes which can be used in such processes. Electrowinning generally involves the recovery of a metal by deposition of the metal from aqueous leach liquors obtained by leaching an ore or concentrate with an aqueous electrolyte. Conventional electrowinning processes employ cells containing planar or grid-type anodes and planar cathodes. The anodes are generally insoluble and serve to conduct electricity to the electrolyte but in some instances the anode may consist of, for example, a corrodible matte anode. The nature of the cathode at the start of the process varies widely from process to process and may be, for example, a stainless steel, a titanium or an aluminium electrode on to which a thin layer of relatively pure metal is then deposited or a thin sheet of relatively pure metal (called a starting sheet and usually produced by deposition of the metal on to electrodes such as those mentioned above). During the electrowinning processes the metal to be recovered is deposited on the cathode which is permitted to grow to the desired thickness. The fully grown cathode is then removed from the cell for further processing. The electrolyte usually consists of an aqueous solution of one or more salts of the metal which solution is formulated so as to promote electrodeposition of the metal on the cathode in such form and purity as is desired and at acceptable power efficiencies. The cathodic current density is limited to relatively low values, e.g. 100–350 A/m$^2$ for copper electrowinning, by the mass transfer effects at the cathode. In practice, operating conventional electrowinning cells above a certain critical current density would yield unacceptably rough, and therefore impure, cathodic products. The value of this critical current density is limited by the rate of the mass transfer processes transporting metal ions from the bulk of the electrolyte to the cathode and is a function of the following variables:

1. Concentration of metal ions in the electrolyte.
2. Conductivity of the electrolyte.
3. Concentration overpotential.
4. Activation overpotential.
5. Presence of impurities and solids.
6. Presence of additives, such as levelling agents, brightness etc.

In recent years there have been described particulate electrodes which comprise a number of discrete particles consisting wholly or partially of electroconductive material and which, when the electrode is in use, are caused to move so as to be in intermittent contact either directly or through the agency of intermediate particles with at least one current conductor (which is often called the "current feeder" or "feeder electrode") by means of which an electric current is conducted to the particles. The electrical conductivity of the current conductor is generally not less than 10$^4$ ohm$^{-1}$cm$^{-1}$.

Particulate electrodes have been developed in a number of different forms. In one form, a mixture of the particles of the electrode and an electrolyte is pumped through a portion of the cell which contains the current conductor and in which the electrode reaction occurs, then around a circuit outside this portion of the cell, and is finally returned to the portion in which the electrode reaction occurs for further reaction. In another form, the particles of the electrode remain within the portion of the cell which contains the current conductor — while an electrolyte only is passed through this portion and then around a circuit outside this portion. Included within this latter form are electrodes which, in operation, comprise a bed of particles through which there is an upward, evenly distributed, flow of the electrolyte; the particles become suspended in the electrolyte which flows at a rate such that the bed becomes expanded in volume, usually by more than 20 and an generally by 40 to 50 percent. The pattern of flow of electrolyte is arranged to be substantially constant through a horizontal cross-section within the bed of particles in order to achieve substantial uniformity of particle concentration in the horizontal plane. The terminology of fluidized beds has been applied to this form of particulate electrode and many of the properties of fluidized beds are evident in the behaviour of these so-called "fluidized bed electrodes". The high surface area of a fluidized bed electrode makes possible either the efficient electrolysis of dilute solutions or the use of a high current per unit volume of cell and per unit volume of electrolyte; for example, in copper deposition current densities up to 3000 A/m$^2$ and more have been used experimentally. Particulate electrodes have been the subject of much research recently and examples of their formation, including fluidized bed electrodes, and their use in various electrochemical processes are disclosed in, for example, British Pat. Specification No. 1,194,181, U.S. Pat. Nos. 3,180,810, 3,527,617, 3,551,207 and 3,703,446, French Pat. No. 1,500,269 and Canadian Pat. No. 700,933.

In many electrochemical processes using particulate electrodes the electrode reaction involves deposition of ions on to the particles or dissolution of the material of the particles. In such processes the dimensions of the particles change with time and there may be provision for removal and replenishment of the particles. The choice of working conditions in such processes may be influenced by:

1. the need to avoid agglomeration of the particles of the electrode, paticularly the particles of a cathode on which electrodeposition of metal is taking place and particularly at diaphragms interposed between the anode and the cathode where agglomeration or plating has in the past been found to occur frequently;

2. the need to avoid excessive electrodeposition of the product of a cathode reaction on to the current conductor or agglomeration of the particles on the current conductor; and 3. the need to ensure a satisfactory rate of progress of the electrode reaction.

4. the need to obtain acceptable power efficiencies. Whilst the tendency towards agglomeration of particles may be reduced by increasing the rate of flow of electrolyte through the bed of particles, this increase in rate of flow in turn may reduce the rate of passage of charge from the current conductor to the particles of the electrode but increases the rate of passage of charge from the current conductor to the electrolyte and thus may increase the quantity of the product of the electrode reaction deposited at the current conductor.

It is an object of the present invention to provide an electrochemical process employing a particulate electrode in which the disadvantages of the particulate electrodes referred to above are ameliorated.

It is a further object of the invention to provide an improved method for the electrodeposition of metals.

It is a still further object of the invention to provide a novel particulate electrode, and a novel electrochemical cell incorporating said particulate electrode, suitable for use in electrochemical processes, including the electrowinning of metals such as copper, cobalt and nickel.

SUMMARY OF THE INVENTION

According to one aspect of the present invention there is provided, in an electrochemical process wherein an electrolyte is passed through one electrode compartment of an electrochemical cell, said one electrode compartment comprising a particulate electrode and being separated from a second electrode compartment of said electrochemical cell containing a counter-electrode by a separator having an ion-permeable wall, the inprovement which comprises controlling the distribution of the particles of said particulate electrode in the electrolyte during the process in a manner such that there is formed within said one electrode compartment a first region which is adjacent to the ion-permeable wall and within which first region substantially all the particles are, for a large proportion of the time they spend in said first region, separated from each other, and a second region which is spaced from the ion-permeable wall and within which second region substantially all the particles are, for a large proportion of the time they spend in said second region, in contact with other particles, and circulating substantially all the particles between said first and second regions.

According to a second aspect of the present invention there is provided an electrode system, suitable for use with a counter electrode to perform an electrochemical process in accordance with the invention, which electrode system comprises a particulate electrode, a current conductor, a vessel containing said particulate electrode and current conductor and having an ion-permeable wall at least a part of which is inclined towards the particulate electrode, and means for flowing a fluid medium through said vessel in contact with said particulate electrode.

According to a third aspect of the present invention there is provided an electrochemical cell which comprises at least one particulate electrode system according to the second aspect of the invention and at least one counter-electrode separated from said particulate electrode by said ion-permeable wall.

When the distribution of the particles is controlled in accordance with the process of the invention, the density of particles adjacent to the ion-permeable wall is low and there is formed at the back of said one electrode compartment, i.e. remote from said ion-permeable wall, a region spaced from the ion-permeable wall in which the density of particles is high and approaches that of a static settled bed of these particles.

DESCRIPTION OF EMBODIMENTS OF THE INVENTION

The current conductor (or current feeder) is advantageously disposed within the second region, i.e. the high density region. Disposing the current conductor in the high density region enables electrical charge to be rapidly and efficiently conveyed amongst the particles of the particulate electrode in the high density region with little or no electrodeposition of metal taking place on the current conductor. Furthermore, with the low density region adjacent to the ion-permeable wall, which may be a fragile membrane or diaphragm, there can be expected a lower risk of failure of the ion-permeable wall due to agglomeration and adherence of particles to the ion-permeable wall with subsequent electrodeposition on or within the ion-permeable wall itself.

With the current conductor disposed in a high density region its exact location is far less critical than is the case, for example, with a fluidized bed electrode. A current conductor in the form of a single conductor rod located anywhere in the high density region is generally sufficient to ensure that electrical current is provided to all parts of this region. However, depending on the amount of current to be conveyed to the particles, it may be desirable to provide alternative designs of current conductor. A particularly advantageous design of current conductor comprises a flat plate recessed into the wall of the electrode compartment opposite the ion-permeable wall. Current is supplied to this current conductor by means of a conductor bar from the top of the electrode compartment. It has been found that with a particulate electrode consisting of copper particles the effective area of the current conductor plate need only be about 5% of the area of the face of the particulate bed adjacent to the back wall of the compartment but it may be larger, especially for particles consisting of material of lower electrical conductivity.

The desired distribution of the particles of said particulate electrode in the electrolyte may be controlled, at least in part, by appropriate flow of a fluid medium through the particulate electrode. The electrolyte which is passed through the electrode compartment containing the particulate electrode can be used conveniently as the fluid medium. In this case, it is preferable if the electrolyte is caused to flow upwardly through the particulate electrode in such a manner as to give rise to circulation of the particles of the particulate electrode upwardly adjacent the ion-permeable wall and downwardly at the back of the electrode compartment. In this way most of the particles are circulated upwardly through a major proportion of the height of said first region and downwardly through a major proportion of the height of said second region. The desired electrolyte flow can be imposed by inclining the ion-permeable wall towards the particulate electrode as required by a particulate electrode system according to the second aspect of the invention.

The angle of inclination of the ion-permeable wall to the vertical and towards the particulate electrode will depend to some extent upon the design of the remainder of the particulate electrode system. The angle of inclination will lie within the range of from 1° to 45° from the vertical. It has been found that while some designs operate well at an inclination below 10°, e.g. from 3° to 6°, others operate satisfactorily at greater inclinations, e.g. from 15° to 25°.

The distribution of the particles is controlled so that the overall volume expansion, i.e. the volume occupied by the bed of particles within the electrode compartment which bed includes both high and low density regions, during the process is less than 25% greater than that of a static settled bed of the particles. Generally, the overall volume expansion will not exceed 20% and it is believed to be preferable for the overall volume expansion to lie in the range of from 3% to 13%, for example 8% to 12%.

The electrode compartment containing the particulate electrode conveniently has a configuration in which its height and its width are substantially greater than its thickness, i.e. the distance between the ion-permeable wall and the opposite wall thereto, i.e. the back wall. The height and width of the electrode compartment may each be of the order of 50 to 100 centimeters or more, whereas the thickness of the compartment is generally less than 10 centimeters, for example 5 centimeters. The particulate electrode system has performed well when the electrode compartment is of truncated wedge-shaped form. In this form of compartment, both the ion-permeable wall and the back wall of the compartment, are inclined to the vertical with the back wall having the greater inclination. It has also been found that compartments in which the back wall is parallel to the ion-permeable wall give good results. Electrode compartments comprising an upper, plane parallel configuration and a lower, wedge shaped configuration and compartments comprising an upper, wedge shaped configuration and a lower, plane parallel configuration have also performed well. Experiments with substantially wedge shaped compartments have indicated that the preferred range of wedge taper angles is from 1:20 to 1:5, with the best wedge taper angle being about 1:10 or less as the electrode compartment height is increased. (A wedge taper angle of 1:10 means that for every 10 cm up the ion-permeable wall the back wall is spaced a further 1 cm from the ion-permeable wall.) However, the optimum angle depends on the height of the particulate electrode during the process.

In one embodiment of the invention, the electrochemical cell may have added to it a second identical particulate electrode compartment on the opposite side of the compartment containing the counter-electrode. In this event, the compartment containing the counter-electrode would assume a wedge-shape to ensure an equal and directionally opposite inclination for the added particulate electrode compartment. In a further embodiment, the electrode compartment is repeated vertically, e.g. cathode compartments can be stacked vertically.

The fluid medium, which may be the electrolyte, is introduced to the compartment containing the particulate electrode through a flow distributor in the base of the compartment. Usually, the flow distributor takes the form of a manifold feeding a plurality of inlet passages arranged along the width of the base of the electrode compartment. Such flow distributors may further comprise predistributing sparge pipes beneath the inlet passages and wedge shaped portions in the base of the electrode compartment immediately above the inlet passages. The inlet passages may comprise conical portions. In another form of flow distributor, it is proposed to locate an open helical coil along the width of the base of the electrode compartment. This provides a flow distributor the aperture of which is easily adjusted and which is easily closed off, merely by closing the coil when the electrode system is not in operation. It may be advantageous to introduce additional fluid medium for example, using fanning jets at one or more positions above the flow distributor and adjacent the ion permeable wall in order to assist in the control of particle distribution.

Undesirable disturbances in the flow pattern of particles in the electrode compartment can be reduced by installing one or more flow directors within the electrode compartment. These flow directors conveniently comprise one or more planar members disposed substantially vertically and are preferably parallel to, but may be normal to, the ion-permeable wall. The flow directors need not divide the compartment completely and thus may take a form of several members spaced from one another or may consist of mesh material which spans the whole or a part of the width of the compartment. Another way of modifying the flow characteristics in the electrode compartment is to employ a corrugated ion-permeable membrane. The corrugations of the membrane are arranged vertically and function as short flow directors. Such a membrane may be employed with or without other flow directors and has the further advantages of greater rigidity and greater surface area than a planar membrane.

In order to separate large particles from small particles during the course of the process, as may be desirable for example in an electrowinning process, a sieve may be provided, for example, at the top of the bed of particles to catch the large particles. The sieve could have a mesh size suitable to return particles below a certain size to the bed of particles and to retain the larger particles to be led off from the cell. Alternatively, use can be made of the hydraulic properties of the bed of particles: a simple dip tube inserted primarily into the low density region with its end towards the bottom of the region will conduct a stream of electrolyte bearing a number of particles well above the mean top level of the bed of particles in the electrode compartment and this may be used to transfer particles from the electrode compartment. In another form the tube may be positioned at a slope, and may be branched to return finer particles directly to the electrode compartment. Other ways of effecting the removal of particles from the electrode compartment comprise installing a simple syphon in the bed of particles or draining the particles from the base of the bed by a self-cleaning valve arrangement.

The structural members of the particulate electrode system and electrochemical cells comprising such electrode systems are conveniently constructed from an electrically insulating, fluid-impermeable material such as poly(vinyl chloride), a rubber or a poly(methyl methacrylate). Alternatively, these materials may be provided as coatings on other constructional materials such as steel. Other materials which may be used include concrete and glass fibre-reinforced plastics materials.

Materials which may be used for the ion-permeable wall include "Terylene" cloth, plastics material, such as poly(vinyl chloride), which have been rendered micro-porous, a polyester mat impregnated with phenolic rein, a porous ceramic material or an ion-exchange material.

To protect the ion-permeable wall from abrasion or other damage from particles, a holed non-conducting screen, such as a Terylene mesh, may be placed adjacent the ion-permeable wall. This screen would serve to shield the ion-permeable wall from damage or deposition and it or the ion-permeable wall may be removed for periodical cleaning and replacement.

A wide range of electrically-conductive materials are available for the construction of the counter-electrode. This electrode may be dimensionally stable or may dissolve as the electrolytic process proceeds. Dimensionally stable anodes suitable for use in electrowinning processes conveniently take the form of a plate, mesh or grid of titanium, activated on their surfaces by a coating of a noble metal or a noble metal oxide or a mixture of noble metal oxides and base metal oxides. Electrochemical cells according to the invention may employ as both anode and cathode a particulate electrode system according to the invention. However, when the electrochemical cell comprises one particulate electrode and one massive electrode, there will be a substantial pressure difference across the ion-permeable wall between these two electrodes. Unless the ion-permeable wall has substantial strength the pressure difference may be sufficient to rupture it. It is therefore advantageous to provide means to support the ion-permeable wall against this pressure difference. Besides physically supporting the membrane, e.g. with a strong porous backing plate, one way to achieve this is to provide means to balance the operating pressures in the two compartments. Thus, there may be provided in the compartment containing the massive electrode a pressure regulator in the form of a flow impeder comprising a series of baffles, perforated plates or a packing. When electrolyte flows through the compartment containing these flow impeders the hydrostatic pressure is greater than that present in the absence of flow impeders and can be made substantially equal to that within the particulate electrode compartment on the opposite side of the membrane.

A further advantage of installing such flow impeders is that the tendency for migration of electrolytes between compartments is reduced. This may make possible the replacement of the ion-permeable wall with a coarser and more robust, but more permeable, material, e.g. a filter cloth or a perforated plate.

The use of a particulate electrode system according to the present invention in an electrochemical cell makes it readily possible to prevent the escape of the "acid mist" which is liberated at the electrolyte surface as the gas bubbles burst in the course of some electrochemical processes. Thus a cover can be placed over the top of the electrode compartment and an outlet can be provided for collection for use of gases evolved at the electrode, while the acid mists may be separated from the gases either inside or outside the cover.

The process, particulate electrode system and electrochemical cell of the present invention find particular application in the electrodeposition of metals. More particularly, this invention is especially applicable to the electrodeposition of metals such as gold, silver, copper, iron, the platinum group metals, cobalt, zinc, nickel and manganese from aqueous solutions of salts thereof. Such electrodeposition processes may be purification processes or metal electrowinning processes. In such cases it is advantageous for the particulate electrode system to constitute the cathode.

Thus, according to one embodiment of the present invention, there is provided, in a process for electrowinning a metal wherein an electrolyte comprising an aqueous solution of one or more salts of said metal is passed through a cathode compartment of an electrochemical cell, said cathode compartment comprising a particulate cathode and being separated from an anode compartment by a separator having an ion-permeable wall, the improvement which comprises introducing small particles into said cathode compartment wherein they form part of the particulate cathode, extracting particles on which metal has been elecrodeposited from said cathode compartment, controlling the distribution of the particles of said particulate cathode in the electrolyte during the process in a manner such that there is formed within said cathode compartment a first region which is adjacent to the ion-permeable wall and within which first region substantially all the particles are, for a large proportion of the time they spend in said first region, separated from each other, and a second region which is spaced from the ion-permeable wall and within which second region substantially all the particles are, for a large proportion of the time they spend in said second region, in contact with other particles, and circulating substantially all the particles between said first and second regions.

When the distribution of particles is controlled by appropriate flow of the electrolyte through the particulate cathode, in the manner described above, there is thought to be a diffuse transition region between said first and second regions, in which transition region the density of particles graduates from that in the first region to that in the second region. Furthermore, there are normally present turbulent regions, both at the top of the bed of particles and adjacent the flow distributor, in which turbulent regions the density of particles is not as great as in said second region. Since electrodeposition in these turbulent regions may give rise to undesirable effects, it is advantageous to restrict the active area of the ion permeable wall and/or the anode so as to render these turbulent regions electrochemically inactive. Preferably, the introduction of the small particles and the extraction of the particles in which metal has been electrodeposited is controlled so that apart from the small fluctuation produced by such introduction and extraction, the conditions within the electrode compartment do not change significantly during the process.

Electrochemical cells having a particulate cathode system in accordance with the invention provide a very large ratio of cathode surface area to cell volume when compared with conventional electrowinning cells using planar electrodes and therefore for given cell current the effective cathode current density is reduced compared to that in conventional cells. For this reason even at relatively high cathode current densities of 1000 amps per square meter when expressed relative to the electrochemically active area of the ion-permeable wall or to the projected anode area the true cathode current density and therefore the rate of mass transfer of metal ions to the cathodic particulate surface is very low. Therefore, even with low concentrations of metal ions in the electrolyte it is possible to operate at high current efficiency and without polarization of the cathode. This means that when an electrochemical cell according to the invention is used for recovering metal from electrolytes by electrowinning it affords a much more flexible recovery process than is the case using conventional electrowinning cells which are often uneconomic, and therefore not used, for recovering metals from the more dilute solutions. It is therefore possible using an electrochemical cell according to the invention to deplete the metal from normal concentrated electrolytes to much lower levels than is practicable with conventional elctrowinning cells while still maintaining an acceptably high current efficiency. This means that a greater quantity of metal can be extracted from a given volume and concentration of electrolyte. Whereas, for example, it is common practice to deplete copper electrolyte from 40 gpl to 30 gpl copper in a conventional electrowinning plant, with a plant using electrochemical cells according to the invention it is possible to increase the copper extraction without further loss of current efficiency or increase of cathodic polarization, and to deplete the copper electrolyte from 40 gpl copper to, say, 5 gpl copper or to any selected concentration that would be most economic for the particular process.

In an electrowinning process using dimensionally stable or inert anodes, the anode reaction with sulphate solution electrolytes reults in the liberation of oxygen, with chloride solution electrolytes it results in the liberation of chlorine and with mixed sulphate/chloride solution electrolytes it results in the liberation of one or a mixture of these gases depending on the relative concentration of the sulphate and chloride ions in the electrolyte. In all cases the liberation of these gases and the subsequent bursting of the gas bubbles as they reach the surface of the electrolyte causes minute quantities of electrolyte to be dispersed into the atmosphere causing the evolution of acid mist. The presence of acid mist is most undesirable because of its corrosive properties and in addition it is injurious to health. In conventional electrowinning cells various techniques are used to minimize the liberation of acid mist into the atmosphere. For example, plastic balls are added to the surface of the electrolyte in the cell or organic mist suppressants or foaming agents are added to the electrolyte. It is also possible to collect the anode gas in especially designed anode hoods or to cover the cell completely and to supply a slight suction to either the anode hoods or cell cover to remove anode gas and acid mist. All these systems are costly, inconvenient, and not always fully effective in supressing the liberation of acid mist into the atmosphere. With a particulate electrode system, and an electrochemical cell according to the invention, anode gas, and therefore acid mist collection, are simplified, as has been mentioned hereinbefore. Thus, the collected gas may be easily scrubbed free of acid mist at conveniently situated scrubbers. In addition it is a simple matter to collect the anode gas in pure form without loss of gas or dilution of the gas by ingress of air. In the case of chloride solution electrolytes where highly toxic chlorine gas is liberated this is an especially important feature. Economic use of the collected anode gas can now readily be made.

With a process according to the present invention current densities of up to 10,000 amps per square meter relative to the projected active area of the anode have been successfully operated during copper electrodeposition from aqueous solutions of copper salts. Even at this high current density, a strongly adherent, even deposition of copper on to the particles of the particulate electrode can be obtained. In such processes depending on electrolyte concentration and current density, the potential difference between the anode and the current conductor may be similar to or only slightly lower than those obtaining in conventional electro-winning cells.

The concentrations of the various ionic species present in the electrolyte may be similar to those obtaining in conventional electrowinning processes. Thus the concentration of the species of metal ion which is to be electrodeposited is usually around 50 gpl. The solution is normally acid and the cation present is often the sulphate ion so that a concentration of between 50 gpl and 150 gpl of $H_2SO_4$ is often present. However, the properties of the particulate electrode system of the invention provide greater flexibility in the choice of catholyte compositions. Metal ions may be removed from the catholyte down to a concentration as low as a few parts per million (ppm).

Preferably, metal is electrodeposited on to particles composed of the same metal. These metal particles will normally have sizes in the range of from 100 to 3000 $\mu$m. Preferably, the new particles introduced to the cathode compartment have sizes in a rather more restricted size range, for example from 200 to 1000 $\mu$m preferably from 200 to 700 $\mu$m. It is possible to deposit one metal on to particles of another metal, e.g. cobalt or nickel can be deposited on to copper particles and such a procedure may have application, for example, in the preparation of alloys.

The current conductor, or current feeder, may be constructed of any good electrically-conductive material resistant to corrosion in the electrolyte used. As stated above, this catholyte is often acid of low pH and stainless steel is often a suitable material from which to prepare the current conductor under such conditions. Alternatively, the current conductor may be constructed of the metal being electrodeposited so that any electrodeposition on to the conductor allows it to be sold as conventional cathode stock if electrodeposited metal builds up over a long period of time.

BRIEF DESCRIPTION OF THE DRAWINGS

For a better understanding of the present invention, and to show more clearly how the same may be carried into effect, reference will now be made, by way of example, to the accompanying drawings, in which:

FIGS. 1 and 2 show vertical sections of two embodiments of electrochemical cells, the sections being normal to the width of the cells and showing the thickness of the cells;

FIG. 3 is a fragmentary section of part of a further embodiment of an electrochemical cell;

DETAILED DESCRIPTION OF THE DRAWINGS

Figure 1:
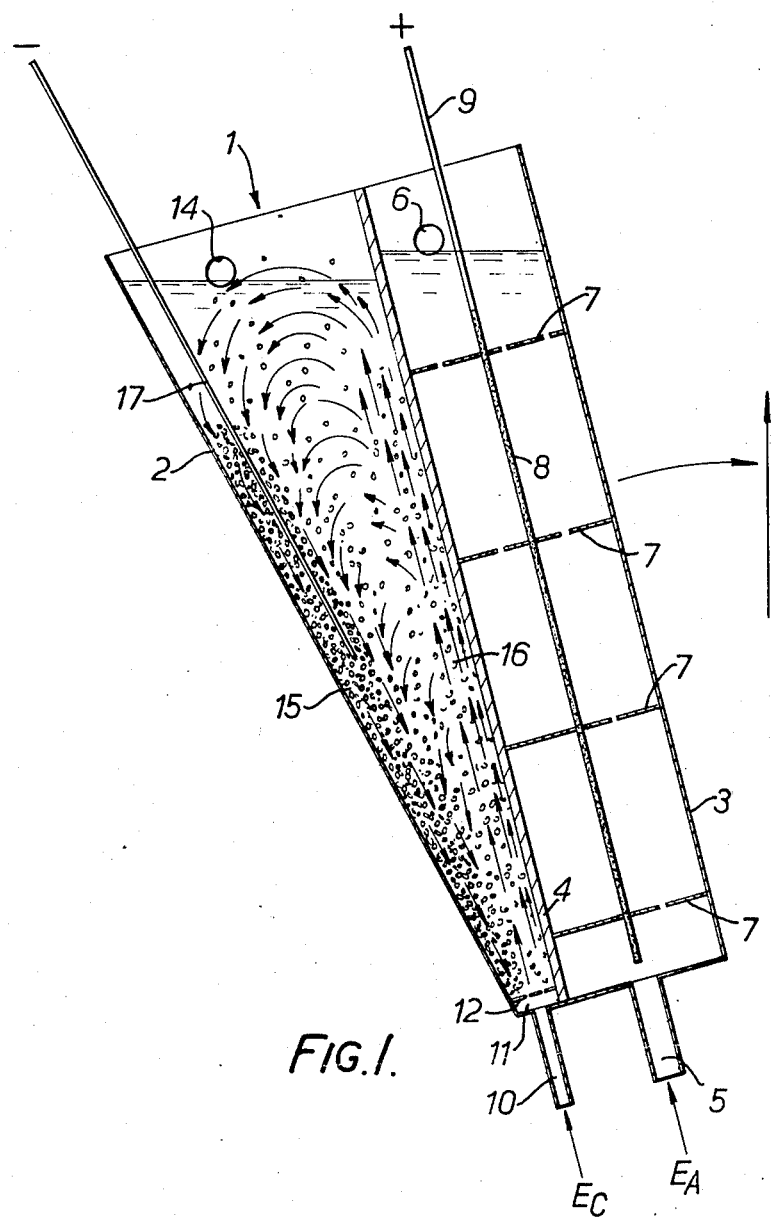

Referring first to FIGS. 1 and 2, the electrochemical cells 1 each comprise a cathode compartment 2 and an anode compartment 3 separated by an ion-permeable wall 4. The anode compartment 3 is provided with an anolyte inlet 5 and an anolyte outlet 6. Baffles 7, which restrict the flow of anolyte $E_A$ through the anode compartment, are included in the anode compartment. An anode comprising a platinum coated expanded titanium mesh 8 is provided within the anode compartment. Current is conveyed to the anode by a conductor member 9 welded to the anode 8. Catholyte $E_c$ can be introduced to the cathode compartment by means of inlet conduits 10 at the base of the cathode compartment 2. These inlet conduits 10 debouch into a chamber 11 below a flow distributor 12. In the embodiment shown in FIG. 2, the flow distributor 12 comprises a series of conical passages 13. Catholyte can leave the compartment by outlet conduits 14. Within the cathode compartment 2 there is provided a bed of particles which comprises a region 15 of high density and a region 16 of low density. Cathodic current conductor rods 17 extend into the high density region 15.

FIG. 3 shows an alternative current conductor for the cathode compartment of an electrochemical cell which is otherwise constructed as shown in FIG. 2. The current conductor comprises a plate 19 recessed into the back wall of the cathode compartment. Current is conducted to the plate 19 by a conductor member 20.

Figure 4:
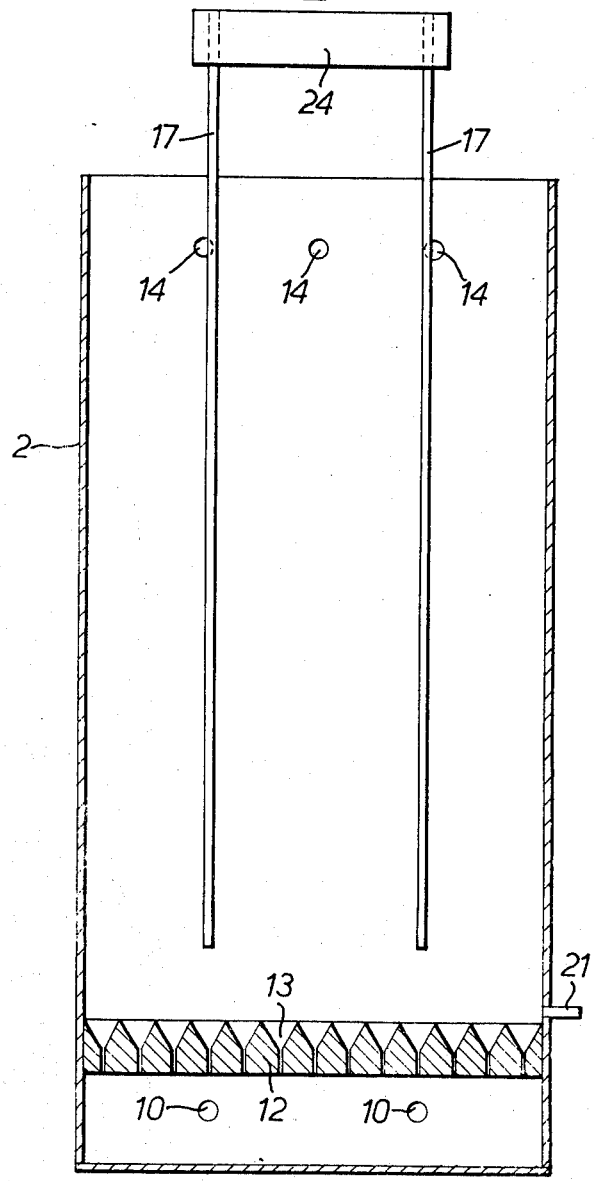
FIG. 4 shows a section of the cell of FIG. 2 taken along the line IV—IV of FIG. 2 and looking towards the back wall of the cathode compartment.
Figure 5:
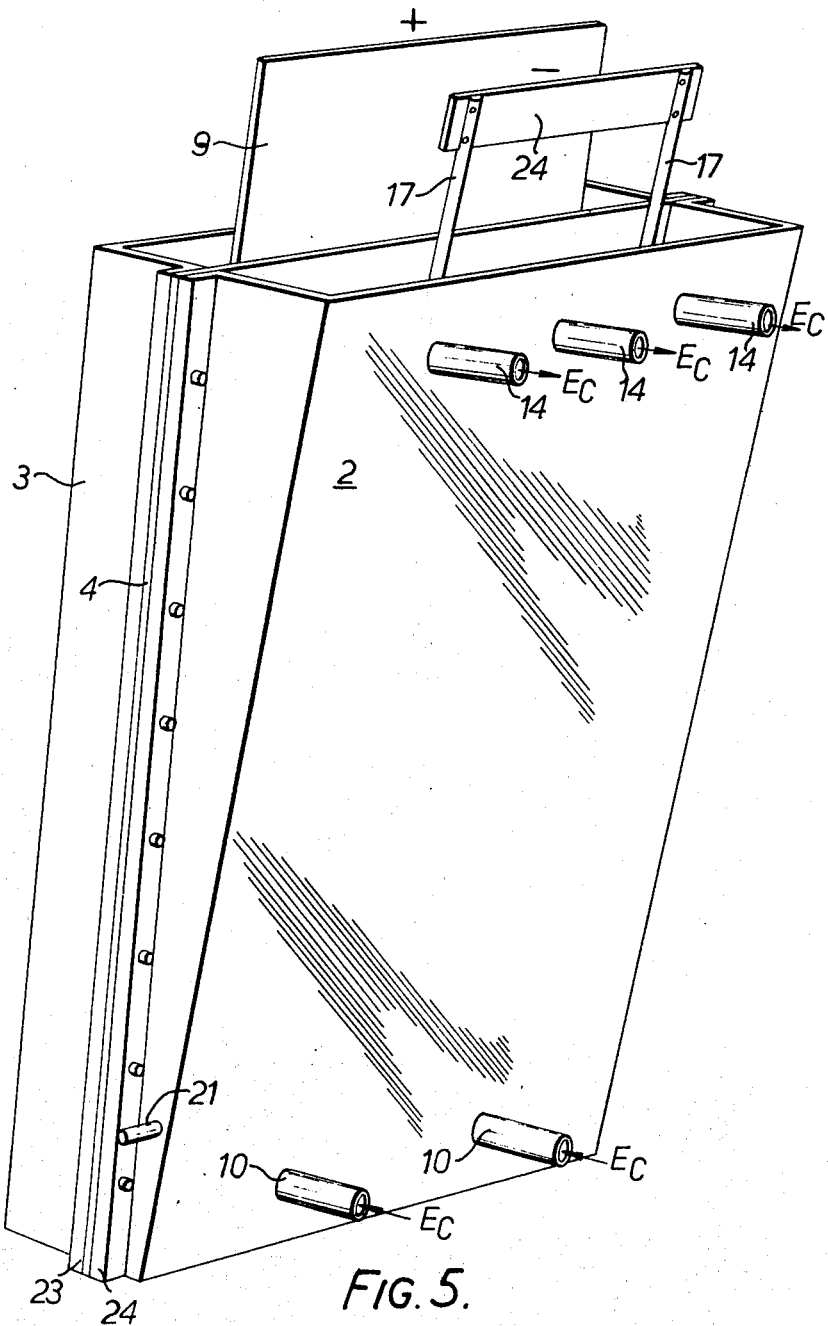
FIG. 5 shows a perspective view of the cell of FIGS. 2 and 4.

Referring now to FIG. 4, the disposition of the current conductor rods 17 and the passages 13 within the flow distributor 12 of the cell shown in FIG. 2 can be seen more clearly. A conduit 21 is provided at the base of the cathode compartment for the removal of particles contained therein. In FIG. 5, external features of the electrochemical cell of FIGS. 2 and 4 are shown more clearly. At the junction of the anode compartment 3 and the cathode compartment 2 there are provided flanges 23 and 22 respectively. Sandwiched between these two flanges is the ion permeable wall 4. FIG. 5 also shows cathodic and anodic current conducting members 9 and 24 respectively.

Figure 6:
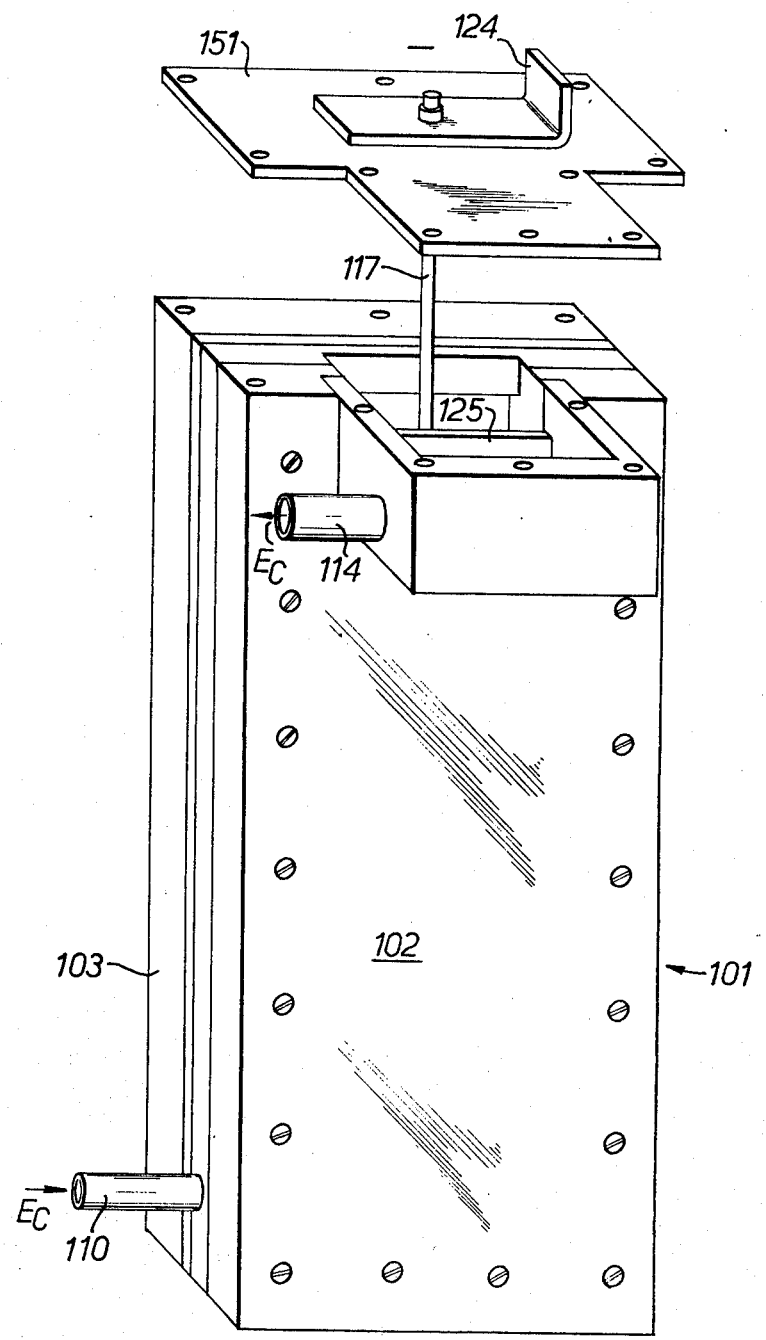
FIG. 6 shows a perspective view of a further embodiment of an electrochemical cell.

FIG. 6 shows in perspective view another embodiment of an electrochemical cell according to the present invention. An electrochemical cell 101 comprises a cathode compartment 102 and an anode compartment 103. Catholyte is supplied to the cathode compartment by a single inlet conduit 110 and leaves the compartment via a weir 125 and outlet conduit 114. A single current conductor rod 117 is provided within the cathode compartment and the cell has a cover 151 through which the current conductor rod 117 passes to a conductor member 124.

Figures 7, 8:
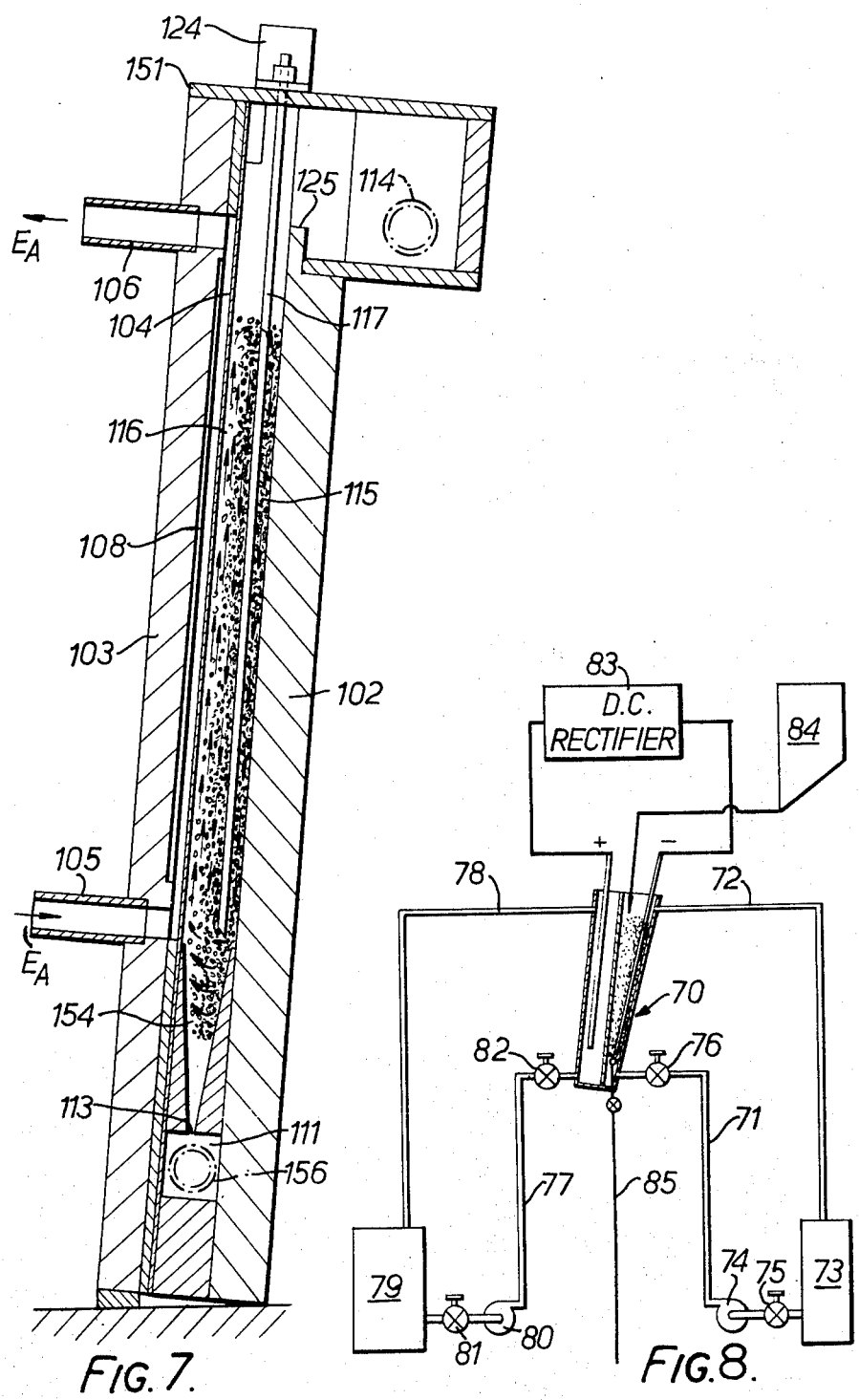
FIG. 7 shows a vertical section of the cell shown in FIG. 6, this section being normal to the width of the cell and showing the thickness of the cell.
FIG. 8 shows schematically an electrodeposition process.

In FIG. 7 the cathode compartment 102 and anode compartment 103 are seen to be separated by an ion permeable membrane 104. Anolyte is admitted to the anode compartment by a single inlet conduit 105 and leaves the compartment by a single outlet conduit 106. An anode 108 constructed of similar materials to the anode 8 is recessed into the back wall of the anode compartment 103. Catholyte passes through a predistributing sparge pipe 156 into a chamber 111 and then through a series of passages 113 and a wedge shaped section 154 to the cathode compartment 102. In the cathode compartment is a bed of particles comprising a region of high density 115 and a region of a low density 116. A current conductor rod 117 extends into the high density region 115.

FIG. 8 shows schematically an apparatus for carrying out an electrowinning process in accordance with the invention. Catholyte is fed continuously to a cell 70 by a conduit 71 and leaves the cell by another conduit 72. Catholyte is stored in a storage tank 73 and is pumped around the circuit including the tank and the cell by a pump 74. An isolating valve 75 and flow control valve 76 are provided in this circuit. A similar circuit comprising similar components 77 to 82 is provided for the anolyte. A potential difference is applied to the electrodes of the cell, current being provided by a d.c. rectifier 83. Particles are supplied from a feed stock tank 84 and are removed periodically from the cell by the conduit 85.

During operation of the cell shown in FIGS. 2, 4 and 5, catholyte is passed through the flow distributor 12 at a rate sufficient to lift the heaviest particles in the bed of particles. The catholyte tends to travel mainly in a first region 16 of the bed of particles adjacent to the ion permeable membrane 4 creating a low particle density and high catholyte flow rate therein. The particle density and catholyte flow rate in this first region 16 are low and high respectively relative to a region 15 around the current conductor 17 which region 15 tends to remain less distributed by the more slowly upward flowing catholyte therein and thus to contain a greater density of particles than the region 16 adjacent the ion permeable membrane 4. In the region 15 surrounding the current conductor 17, the particles tend to slide or roll down the steeply inclined back wall of the compartment 2 generally in contact with one another. The arrows shown in FIGS. 1 and 6 indicate the flow patterns of movement of particles which are believed to take place. It appears that particles are carried from the vicinity of the flow distributor 12 by the catholyte up the low density region 16 adjacent the ion permeable membrane 4 eventually to fall from this region under the force of gravity to be transferred to the high density region 15 surrounding the current conductor 17.

The flow of catholyte up through the high density region 15 is not sufficient to carry the particles with it, and the particles in this region thus tend to slide or roll downwards substantially parallel to the back wall of the compartment to replace thode removed from the vicinity of the flow distributor 12. It is believed that not all particles are carried by the catholyte flow to the top of the low density region 16 of the bed of particles. It is thought that some particles leave the low density region to join the high density region 15 at various levels up the cell. It is also thought that particles may leave the high density region 15 before reaching the flow distributor 12 at the base of the compartment.

Flow of catholyte will in general be such that the overall volume expansion of the bed of particles within the cathode compartment does not exceed 20 %. The optimum overall volume expansion of the bed of particles for any particular case will, however, depend also on a number of factors such as the density of the material of the particles, the density of the electrolyte, the flow rate of the electrolyte and so on.

In order to conduct an electrolytic process within the cell, anolyte $E_A$ is passed through the anode compartment 3 so that the anode 8 is immersed in anolyte and a potential difference is applied across the current conductor 17 and anode 8. Metal is electrodeposited on to the particles of the particulate cathode and these may be removed periodically as they become larger. The size distribution of the particles of the particulate electrode is maintained by the addition of small feed particles to the particulate electrode. The operation of an electrodeposition process according to the invention in an electrochemical cell as shown in FIGS. 6 and 7 is similar to that described above with reference to the electrochemical cell shown in FIGS. 2, 4 and 5.

The particulate electrode system and electrochemical cell of the present invention give rise to a number of important advantages in their operation. As mentioned earlier the presence of a low density region adjacent the ion permeable membrane prevents electrodeposition in this area. Furthermore the inclination of the ion permeable membrane away from the vertical helps to prevent particles from settling on it and the action of the electrolyte stream against it keeps it clean. Electrodeposition on to the current conductor is substantially prevented by the high density of particles surrounding it. However sufficient electrolyte appears to permeate this high density region to prevent concentration polarization occurring there under typical operating conditions. The flow of electrolyte through the particulate electrode compartment and the movement of particles therein gives rise to desirable mixing effects. Furthermore, as mentioned above, the particles in the high density region adjacent the current conductor are in close contact, making for improved electrical conductor efficiency.

The invention is illustrated by the following Examples in which Examples I to VII are concerned with cathodic processes relating to the electrodeposition of metals, and Example VIII is concerned with an anodic process relating to the dissolution of a metal from a matte.

EXAMPLE I

An electrochemical cell in accordance with the invention with an "IONAC" ion-exchange membrane constituting the ion-permeable wall was used to electrowin copper from a solution of copper in sulphuric acid. The membrane was inclined towards the particulate cathode and away from the vertical at an angle of 4°. The cell had a cathode compartment with a wedge-shaped lower portion extending to a height of 19 cm and a parallel upper portion extending a further 20 cm. The wedge angle of the lower portion was 5½° (i.e. a wedge taper angle of 1:10). The width of the cell was 20 cm. The particulate cathode was formed from copper particles ranging in size from 300 $\mu$m to 800 $\mu$m, and a copper current conductor, or current feeder, was employed.

Catholyte, initially containing 50 grams per liter (gpl) of copper as cupric ions and 50 gpl of sulphuric acid, was passed at a rate of 350 ml/cm²/min with respect to the median cross-sectional area through the cathode compartment of the cell. Meanwhile, sulphuric acid at a concentration of 50 gpl was passed through the anode compartment. Electrodeposition took place at a current density of 2800 A/m² with respect to the projected exposed effective area of the membrane.

Under these operating conditions, the concentration of copper in solution was reduced to 0.04 gpl. An overall current efficiency greater than 90 % was obtained, with no perceptible hydrogen gas evolution at the cathode.

Other experiments were conducted at a current density of 7500 A/m² at which similar current efficiencies were measured.

EXAMPLE II

An electrochemical cell similar to that of Example I was used to electrowin copper from a solution of copper in sulphuric acid in a batch run lasting 16 hours.

The anolyte initially comprised 45 gpl of $H_2SO_4$ while the catholyte contained 40 gpl copper and 56 gpl of $H_2SO_4$. At the end of the batch run the anolyte comprised 69 gpl of $H_2SO_4$ with 10 ppm of copper, while the catholyte contained 0.01 gpl copper and 91 gpl of $H_2SO_4$.

In this instance the membrane was inclined at 3° to the vertical and the catholyte flow rate was initially 13 liters/minute increasing to 16 liters/minute to maintain the overall volume expansion of the bed of particles between 8 and 12 % as the viscosity of the catholyte passing through the bed fell, with changing catholyte composition, from 1.035 centipoises to 0.768 centipoises at a temperature of 40° ± 1°C.

During the experiment the current density averaged 1500 A/m² expressed relative to the projected effective membrane area. The overall current efficiency of the copper electrodeposition process was greater than 90 %. The potential of the cathode was 220 mV with respect to a standard hydrogen electrode.

EXAMPLE III

The same cell as was used in Example II was used continuously in a batch run lasting 125 hours. In this instance, the ion permeable membrane was inclined at 4° to the vertical.

The anolyte initially comprised 50 gpl of $H_2SO_4$ with 2 ppm of copper while the catholyte comprised 50 gpl of both $H_2SO_4$ and copper. At the end of the batch run, the anolyte contained 103 gpl $H_2SO_4$ with 58 ppm of copper while the catholyte contained 29 gpl of copper with 49 gpl of $H_2SO_4$.

The copper particles of the particulate cathode ranged in size from 212 $\mu$m to 1200 $\mu$m and the bed of these particles was maintained at an overall volume expansion of between 8% and 12% by a catholyte flowing at a rate increasing from 13.7 liters/minute to 17.0 liters/minute.

Copper production rate was 124 gms/hr, the fully grown particles being removed periodically. The average current density was 3000 A/m² (with respect to the projected effective membrane area) while the current efficiency of the electrodeposition process was around 95%. The cathode potential against a standard hydrogen electrode was 210 mV.

EXAMPLE IV

A wedge shaped cell similar to that shown in FIGS. 2 to 5 of the accompanying drawings was used to electrowin copper from an acid copper sulphate solution. The cell had a wedge angle of 5°, a width of 20 cm and a height of 50 cm. An "IONAC" ion exchange membrane, constituting the ion-permeable wall, was used to separate the anode and cathode compartments. This membrane was inclined to the vertical at an angle of 6°. The particulate cathode comprised copper particles whose sizes were in the range of from 250 μm to 900 μm.

Catholyte containing 3.26 gpl of copper and 22 gpl of sulphuric acid was passed through the cathode compartment at a flow rate of 18 liters/min. to produce an overall volume expansion of the particulate cathode of between 11 and 13 %. The catholyte contained a total impurity cation concentration of about 10 gpl, the major impurities being Co, 1.88 gpl; Fe (total), 0.78 gpl; and Mg, 5.84 gpl. The temperature of the catholyte was maintained at 40°C ± 1°C.

Anolyte initially comprising 30 ppm copper and 54 gpl sulphuric acid was passed through the anode compartment. Current was passed through the cell at an average current density of 2000 A/m$^2$ (with respect to the projected active membrane area) until the final composition of the catholyte was 0.24 gpl of copper and 25 gpl of sulphuric acid. At this point, the composition of the anolyte was 36 ppm of copper and 58 gpl of sulphuric acid. The overall current efficiency of the copper electrodeposition process was 99.6 %. The cathode potential with respect to the standard hydrogen electrode was 250 mV.

EXAMPLE V

A cell similar to that described in Example IV was used to reduce the concentration of copper ions in a catholyte to a few parts per million. The particulate cathode had copper particles identical in size to those of Example IV and was operated at similar overall volume expansions.

Initially the catholyte contained 1.61 gpl of copper and 22.4 gpl of sulphuric acid. The impurity cation concentration in the catholyte totalled 30 gpl, the major impurity being Co, 7.06 gpl; Fe (total), 2.94 gpl; and Mg, 17.75 gpl. Initially the anolyte comprised less than 1 ppm of copper and 95 gpl of sulphuric acid.

The initial current density was about 2500 A/m$^2$ with respect to the projected available membrane area but as the bulk copper concentration in the catholyte decreased with electrodeposition of copper so the current density was decreased to simulate a stepped, voltage controlled situation. At the end of the experiment the concentration of copper ions in the catholyte was 12 ppm, together with 26 gpl of sulphuric acid. The corresponding anolyte composition comprised 6 ppm of copper and 117 gpl of sulphuric acid. The current efficiency of the overall process was around 60 % and this relatively low value was thought to be due to the presence of $Fe^{3+}$ ions. The current efficiency of copper electrowinning was calculated to be around 90 %, the loss of around 10 % being due to hydrogen generation at the particulate cathode. During the experiment the rate of flow of catholyte was increased from 19.1 liters/min. to 23 liters/min. as the viscosity of the catholyte fell with changing composition. The potential of the cathode with respect to a standard hydrogen electrode varied between the limits of 260 and 223 mV.

EXAMPLE VI

A cell similar to that shown in FIGS. 6 and 7 of the accompanying drawings was used to electrowin cobalt from a cobalt sulphate solution.

The ion-permeable wall of the cell comprises a "DARAK 5000" porous membrane, a material made by W. R. Grace & Co. The membrane was inclined at 15° to the vertical. A stainless steel current conductor and copper particles having sizes in the range of from 300 μm to 1200 μm were used.

In this experiment, both anolyte and catholyte had the same composition, this being initially 30 gpl of cobalt in a sulphate solution of pH 2.7. At an average imposed potential difference of 9.5 V, an average current density of 2500 A/m$^2$, with respect to the active area of the membrane, was measured.

The rate of flow of catholyte through the cathode compartment was of the order of 3.8 liters/min. resulting in an overall volume expansion of the bed of particles of around 10 %.

Final concentrations of ionic species within the electrolyte, i.e. both anolyte and catholyte were 15 gpl of cobalt at pH 0.3.

EXAMPLE VII

A similar experiment to that of Example VI was conducted using an acid copper sulphate solution as electrolyte. The composition of the electrolyte was maintained at 50 gpl of copper and 100 gpl of $H_2SO_4$.

Satisfactory electrodeposition of copper was obtained at a current density of 8000 A/m$^2$, again with respect to the active area of the membrane.

Copper particles in the size range 420–1000 μm were used and as particles were removed, feed particles ranging in size from 420 to 500 μm were added.

EXAMPLE VIII

An electrochemical cell similar to that shown in FIGS. 2 to 5, but in which the particulate electrode was made the anode of the cell, was employed to anodically corrode a nickel/copper sulphur matte. The particulate anode comprised particles of crushed matte of sizes in the range of from 500 to 1650 μm. An electrolyte consisting of copper sulphate and sulphuric acid was flowed through the particulate anode. Current was fed to the particulate anode by a platinum sheet current conductor of area 30 cm$^2$. A copper sheet was used as the cathode. During the experiment an approximate current density of 300 A/m$^2$ was employed, this comparatively low current density being selected to ensure good plating on to the planar copper cathode. Only traces of metal ions diffused through the ion permeable membrane so that the catholyte was progressively depleted of copper ions. Cathode current efficiency was 95 %.

The matte dissolved faster than the equivalent current passed indicating the occurrence of chemical dissolution of the matte. Anode current efficiency was 145 % based on the number of coulombs passed.

During the experiment, the matte rapidly disintegrated. On average, one third of the weight of metal present in the matte was dissolved before the particles of the matte became too small to facilitate good electrical contact. The slude produced by the fine particles was carried out of the cell.

We claim:

1. In an electrochemical process wherein an electrolyte is passed through one electrode compartment of an electrochemical cell, said one electrode compartment containing a particulate electrode which comprises a mass of discrete electroconductive particles and being separated from a second electrode compartment of said electrochemical cell containing a counter-electrode by a separator having an ion-permeable wall, the improvement which comprises (a) controlling the distribution of the particles of said particulate electrode in the electrolyte during the process in a manner such that there are present within said mass a first region which is adjacent to the ion-permeable wall and within which first region the average number of particles per unit volume is relatively small so that at any given time substantially all of the particles are separated from each other, and a second region which is spaced from the ion-permeable wall and within which second region the average number of particles per unit volume is relatively great so that at any given time substantially all the particles are in contact with other particles, and (b) establishing a circulation pattern in said one electrode compartment such that particles circulate along paths passing through said first and second regions.

2. An electrochemical process according to claim 1, wherein the distribution of the particles of said particulate electrode is controlled in such a manner that there is a transitional region disposed between, and having an upright diffuse interface with, each of said first and second regions, in which transitional region the number of particles present per unit volume is intermediate the number of particles present per unit volume of said first region and the number of particles present per unit volume of said second region.

3. An electrochemical process according to claim 1, wherein most of the particles are caused to circulate in a manner such that they flow upwardly through a major proportion of the height of said first region and downwardly through a major proportion of the height of said second region.

4. An electrochemical process according to claim 1, wherein the distribution of the particles is controlled at least in part by introducing a fluid medium into a lower portion of the particulate electrode and flowing said fluid medium upwardly adjacent the ion-permeable wall.

5. An electrochemical process according to claim 4, wherein said fluid medium is urged to flow upwardly at a rate sufficient to lift substantially all the particles of said particulate electrode.

6. An electrochemical process according to claim 4 wherein said fluid medium comprises a liquid electrolyte.

7. An electrochemical process according to claim 4 wherein said fluid medium is an aqueous electrolyte.

8. An electrochemical process according to claim 1, wherein the volume, within an electrode compartment containing a particulate electrode, which is occupied by the particles during the process is less than 20% greater than the volume that would be occupied by a static, settled bed of said particles.

9. An electrochemical process according to claim 8 wherein the volume occupied by said particles is in the range of from 8% to 12% greater than that occupied by a static, settled bed of said particles.

10. In a process for electrowinning a metal wherein an electrolyte comprising an aqueous solution of one or more salts of said metal is passed through a cathode compartment of an electrochemical cell, said cathode compartment contains a particulate cathode which comprises a mass of discrete, electroconductive particles and being separated from an anode compartment by a separator having an ion-permeable wall, the improvement which comprises (a) introducing small particles into said cathode compartment wherein they form part of the particulate cathode (b) extracting particles on which metal has been electro-deposited from said cathode compartment, (c) controlling the distribution of the particles of said particulate cathode in the electrolyte during the process in a manner such that there are present within said mass a first region which is adjacent to the ion-permeable wall and within which first region the average number of particles per unit volume is relatively small so that at any given time substantially all of the particles are separated from each other, and a second region which is spaced from the ion-permeable wall and within which second region the average number of particles per unit volume is relatively great so that at anv given time substantilly all the particles are in contact with other particles, and (b) establishing a circulation pattern in said one electrode compartment such that particles circulate along paths passing through said first and second regions.

11. A process according to claim 10, wherein the distribution of the particles of said particulate cathode is controlled in such a manner that there is a transitional region disposed between, and having an upright diffuse interface with, each of said first and second regions, in which transitional region the number of particles present per unit volume is intermediate the number of particles present per unit volume of said first region and the number of particles present per unit volume of said second region.

12. A process according to claim 10, wherein most of the particles are caused to circulate in a manner such that they flow upwardly through a major proportion of the height of said first region and downwardly through a major proportion of the height of said second region.

13. A process according to claim 10, wherein the distribution of the particles is controlled at least in part by introducing the electrolyte into a lower portion of the particulate cathode and flowing said electrolyte upwardly adjacent the ion-permeable wall.

14. A process according to claim 10, wherein the volume which is occupied by the particles of the particulate cathode during the process is less than 20% greater than the volume that would be occupied by a static, settled bed of said particles.

15. A process according to claim 10 wherein the process comprises electrodeposition of at least one member of the group of ions comprising the platinum group metals, copper, cobalt, nickel, zinc, manganese, silver, gold and iron.

16. A process according to claim 10 wherein the particulate cathode substantially consists of particles having a maximum dimension in the range of from 100 $\mu$m to 3000 $\mu$m.

* * * * *